United States Patent
Etscheid et al.

(10) Patent No.: US 9,927,056 B2
(45) Date of Patent: Mar. 27, 2018

(54) HEATABLE MEDIA LINE HAVING AT LEAST ONE MEDIA LINE WITH TWO CONNECTOR ENDS

(71) Applicant: VOSS AUTOMOTIVE GMBH, Wipperfürth (DE)

(72) Inventors: Tobias Etscheid, Lindlar (DE); Otfried Schwarzkopf, Kürten (DE)

(73) Assignee: VOSS AUTOMOTIVE GMBH, Wipperfürth (DE)

( * ) Notice: Subject to any disclaimer, the term of this patent is extended or adjusted under 35 U.S.C. 154(b) by 338 days.

(21) Appl. No.: 14/351,214

(22) PCT Filed: Oct. 12, 2012

(86) PCT No.: PCT/EP2012/004281
§ 371 (c)(1),
(2) Date: Apr. 11, 2014

(87) PCT Pub. No.: WO2013/053492
PCT Pub. Date: Apr. 18, 2013

(65) Prior Publication Data
US 2014/0366974 A1    Dec. 18, 2014

(30) Foreign Application Priority Data

Oct. 14, 2011   (DE) .................. 20 2011 106 751
Dec. 7, 2011    (DE) .................. 10 2011 120 358

(51) Int. Cl.
*E03B 7/10*    (2006.01)
*F16L 53/00*   (2018.01)
(Continued)

(52) U.S. Cl.
CPC .......... *F16L 53/008* (2013.01); *F01N 3/2066* (2013.01); *F16L 25/01* (2013.01);
(Continued)

(58) Field of Classification Search
CPC ................................ F16L 53/008; F16L 25/01
(Continued)

(56) References Cited

U.S. PATENT DOCUMENTS

2005/0083638 A1    4/2005  Warren et al.
2007/0176418 A1*   8/2007  Frogneborn ............. H05B 3/58
                                                        138/103
(Continued)

FOREIGN PATENT DOCUMENTS

DE    11 2008 003 310 T5    11/2010
JP         08320096 A        12/1996
(Continued)

OTHER PUBLICATIONS

Japanese Application No. JP 2014-534965 Office Action dated Aug. 1, 2016.

*Primary Examiner* — Vishal Pancholi
(74) *Attorney, Agent, or Firm* — Hudak, Shunk & Farine Co. LPA (57) ABSTRACT

A heatable media line having at least one media line with two connector ends, in particular line connectors, and at least two electrical heating elements. At least one element is provided by which a differentiated heat input and/or output is enabled or provided for at both connector ends of the heatable media line.

19 Claims, 4 Drawing Sheets

(51) Int. Cl.
*F16L 25/01* (2006.01)
*F01N 3/20* (2006.01)

(52) U.S. Cl.
CPC .......... *F16L 53/38* (2018.01); *F01N 2610/02* (2013.01); *F01N 2610/10* (2013.01); *F01N 2610/14* (2013.01)

(58) Field of Classification Search
USPC ......................................... 138/33, 32.33, 32
See application file for complete search history.

(56) References Cited

U.S. PATENT DOCUMENTS

| | | | | |
|---|---|---|---|---|
| 2008/0271801 | A1* | 11/2008 | Sonderegger | H05B 3/58 138/33 |
| 2010/0263740 | A1* | 10/2010 | Borgmeier | F16L 25/01 137/341 |
| 2010/0290764 | A1* | 11/2010 | Borgmeier | F16L 25/01 392/468 |
| 2011/0248017 | A1* | 10/2011 | Etscheid | F16L 53/008 219/492 |
| 2012/0008927 | A1* | 1/2012 | Borgmeier | F16L 53/008 392/478 |
| 2012/0234421 | A1* | 9/2012 | Powell | F16L 53/008 138/33 |

FOREIGN PATENT DOCUMENTS

| | | |
|---|---|---|
| JP | 2009521651 A | 6/2009 |
| JP | 2012518138 A | 8/2012 |
| WO | 2007 073286 A1 | 6/2007 |
| WO | 2008 131993 A1 | 11/2008 |
| WO | 2010 063629 A2 | 6/2010 |
| WO | WO 2010105918 A1 * | 9/2010 ............ F16L 53/008 |
| WO | 2011 085154 A1 | 7/2011 |

* cited by examiner

HEATABLE MEDIA LINE HAVING AT LEAST ONE MEDIA LINE WITH TWO CONNECTOR ENDS

FIELD OF THE INVENTION

The invention relates to a heatable media pipeline with at least one media pipeline with two connection ends, particularly pipeline connectors, and at least two electrical heating elements.

BACKGROUND OF THE INVENTION

Assembled media pipelines with at least one media pipeline, which is heatable, and at least partially heatable pipeline connectors are known in the prior art. In vehicles in particular, media pipelines for conveying at least fluid media are provided. At low temperatures, the media pipelines threaten to freeze, for which reason, heating is provided. Pipeline connectors are used for connecting at least two media pipelines or for the connector connection of a media pipeline to a desired unit. Often such media as tend to freeze even at still quite high environmental temperatures, owing to a relatively high freezing point, are conveyed through the media pipelines, as a result of which the functionality, for example, of a vehicle may be impaired or even disturbed considerably. This is particularly apparent in the case of water pipelines for windscreen-washing systems, just as in the case of media pipelines, by means of which aqueous carbamide solution is transported as a medium, which is used as $NO_x$ reaction additive for diesel engines with so-called SCR catalytic converters.

The two connection ends of the assembled heatable media pipeline are usually formed by two pipeline connectors attached at the end of the media pipeline. The heating elements are used for heating the media pipeline and/or the connection ends or pipeline connectors. For this purpose, the same may be arranged internally and/or externally on the media pipeline and the connection ends or pipeline connectors. The heating elements can be wired electrically in series and connected to a common current or voltage source.

It is further known from WO 2010/063629 to operate the heating elements electrically parallel and to supply each heating element separately with an operating current controlled or regulated for adjusting the heating output thereof. Here, each heating element is separately supplied with an own operating voltage, wherein each operating voltage is generated from a supply voltage by means of a pulse-width modulation control clocked with a certain pulse duty cycle for regulating the heating output. The resulting operating current of each heating element results from the effective value of the clocked, pulsed operating voltage and an in each case instantaneous, temperature-dependent resistance of the heating element.

Furthermore known from WO 2008/131993 A1 is the provision of an electrical series connection, as well as a parallel connection of the heating wires of the assembled media pipeline. Furthermore, this published document of the prior art discloses that the heating wire of one of the pipeline connectors is in each case electrically series connected to one of the wire windings of the pipeline and the connection ends of the two series connections at one of the two pipeline connectors in each case are guided outwards for connection of a voltage supply and/or for further connection. The heating conductor can be arranged along the pipeline in such a manner that the electrical resistance thereof is different in certain sections, so that different heating outputs are generated in certain sections.

In these assembled media pipelines of the prior art, individual heating elements or heating wires can therefore be connected to one another in series and/or parallel in each case. Furthermore, it is possible according to WO 2010/063629 A2 to supply the individual heating elements with electrical energy separately from one another and thereby to adjust the respectively required heating output. In the application of such heatable media pipelines, the problem often results, that a different heat requirement exists at the two connection ends of the media pipeline, particularly the two pipeline connectors.

SUMMARY OF THE INVENTION

The present invention is therefore based on the object of developing a heatable media pipeline wherein depending on the use case, a different heat requirement can be covered at the connection ends of the media pipeline.

The object is achieved for a heatable media pipeline wherein at least one means is provided, by means of which, a differentiated heat input and/or output is enabled or is provided at the two connection ends of the media pipeline. Developments of the invention are defined in the dependent claims.

As a result, in contrast with the prior art, particularly WO 2010/063629 A2, the heating output of each individual heating element is not controlled, but rather in a simpler manner, a differentiated heat input and/or output is provided at the connection ends of the media pipeline. A heat output is here understood to mean the input or transfer of heat into the medium flowing through the media pipeline with the at least one end-side pipeline connector, units and/or components connected to the same. The heat transfer usually takes place by means of heat conduction. The differentiation of the heat input or the heat output takes place in an application-specific manner in each case. If, for example, there is a different heat requirement at the two connection ends of the media pipeline, due to different environmental temperatures, as a result of which one warmer or warm end and a by comparison colder or cold end results from the application, wherein for example, the cold end is arranged in the direction of a tank and the warm end is arranged in the direction of a dosing point of an injection apparatus, that is to say close to the exhaust-system branch or the engine in the case of a vehicle, a different output coupling can be provided as means at the two connection ends of the media pipeline. In the hot or warmer region of the heatable media pipeline, the heat radiation present there is often already sufficient for heating the medium flowing through the heatable media pipeline, that is to say in particular for thawing the same in the case of low environmental temperatures outside of a vehicle. In particular, a different number of windings and/or a different arrangement of the heating elements, particularly heating strands, can be provided at the two connection ends or pipeline connectors. In the case of an identical number of strands or heating elements at the two connection ends, the output coupling can be varied there for example by providing a different pitch of the heating elements and/or heating element guide at the connection ends or pipeline connectors.

Furthermore, different heating elements can be provided at the two connection ends and/or the heating elements can have a different resistance in regions of the two connection ends. A different heat requirement at the two connection ends of the media pipeline can therefore be covered by different output coupling at the connection ends. For example, a hot region (as previously mentioned, e.g. at a dosing point close to an engine or exhaust-system branch) is present at the one connection end, wherein a heating element is used with a lower resistance than at the other connection end, which is constructed as cold region (as previously mentioned, e.g. in the region of a tank) and can be provided with a comparatively high resistance of the second heating element. The connection end can here be a pipeline connector, e.g. QC (quick connector).

Furthermore, the heating elements extending along the media pipeline and for arrangement at or on or above the connection end, particularly a pipeline connector, and a third heating element for arrangement at, on or above the other connection end can be provided at one of the two connection ends, wherein the third heating element is connected to the other two heating elements. Thus, no additional heating element is provided at the other connection end, rather the heating elements or heating strands, which extend along the media pipeline, are used for heating this connection end. The other connection end of the media pipeline is heated by the third heating element. Such an arrangement is particularly suitable when providing different thermal masses at the two connection ends, wherein for example a unit at the one connection end has a high thermal mass. This can therefore be taken into account in the configuration of the heatable media pipeline, by varying the number of heating elements and the arrangement thereof at the connection ends. At a dosing side of an injection apparatus close to the engine or exhaust-system branch, no heating element is required for heating the pipeline connector and if appropriately even a part of the media pipeline, owing to the heat present there, at the tank-side end of the heatable media pipeline, the pipeline connector present there is however advantageously heated, as no heat is externally coupled from the tank into the same.

Furthermore, two heating elements can be provided, wherein one or both heating elements is/are arranged at or on only one connection end, particularly pipeline connector. Here, therefore, only two heating elements are provided and only one of the two connection ends is heated, whilst no heating element is arranged on or at the other connection end for heating.

It furthermore proves advantageous to provide three heating elements, wherein at least one of the heating elements is only arranged at or on one connection end, particularly pipeline connector. Thus, only one connection end is heated. When providing three heating elements, it is however also possible for a heating element to be arranged at or on the other connection end for heating the same connection end.

Furthermore, two heating elements can be provided, wherein one heating element in each case is arranged at or on only one connection end, particularly pipeline connector. Thus, only two heating elements are provided, which extend along the media pipeline and in each case one of the same extends on or at one of the connection ends in each case.

It furthermore proves advantageous if the two connection ends, particularly pipeline connectors, are of different thermally conductive construction. In order to construct one connection end more conductively than the other, a metal and/or conductive plastic can be used for example as material at that connection end, whilst the other connection end, which is less conductive compared to the first, consists for example of a standard plastic, such as PE, which is barely conductive. As a result, an increased thermal loadability can be produced, owing to different heat coupling at the two connection ends of the media pipeline, particularly the pipeline connectors of the media pipeline. Furthermore, one connection end can be constructed as coupling part and the other connection end can be constructed as plug connector, for example for a better heat input into a connected component. Owing to the different thermal conductivity, a better temperature distribution can be provided in the region of the pipeline connector and thus also a better heat dissipation for preventing the creation of so-called hot spots. Thus, heat dissipation can take place in a targeted fashion at those points where an increased temperature would otherwise arise.

Furthermore, it is possible, to ensure heat input into a connected component, to provide better heat conduction in the region of the pipeline connector or connection end, wherein differently thermally conductive connection ends are provided. Thus, the heat input into a connected component can be controlled by means of these different conductivities of the connection ends or pipeline connectors connected to the media pipeline.

In order to allow heat input into at least one of the connection ends, the thermal conductivity of this connection end or pipeline connector can advantageously be improved. Thus, a thermally conductive pipeline connector or QC (quick connector) is provided in particular.

It furthermore proves advantageous, to connect the heating elements to one another in such a manner that the same form at least two circuits for the independent and/or different heating of the two connection ends, particularly pipeline connectors. A first circuit can here comprise a connection end and the media pipeline and a second circuit can comprise only the other connection end. Furthermore, it is possible, to operate at least two circuits with different regulation strategies, particularly to provide selective switching off of one of the two circuits, particularly if a predeterminable temperature threshold is exceeded. Furthermore, it is possible to provide a clocked operation and/or continuous operation of the at least one circuit. By providing such different circuits for differentiated heating of various regions of the heatable media pipeline, a different heat requirement at the two ends of the media pipeline or at the connection ends can be covered. Such a different heat requirement at the two connection ends of the media pipeline can for example be caused by different environmental temperatures or else by means of different demands on the output coupling in the connection regions of the media pipeline, that is to say at the connection ends. Especially in the case of a continuous winding of the heatable media pipeline, the first circuit can comprise one connection end, particularly a pipeline connector, and the media pipeline, whilst the second circuit only comprises the other connection end or the other pipeline connector.

The provision of different regulation strategies of the at least two circuits can mean a selective switching of at least one of the two circuits in the event of the exceeding or undershooting of a certain predeterminable temperature threshold or else a clocked operation or continuous operation, so that for example, the one circuit is switched off sooner than the other, in order to cover the different heat requirement at the two ends of the media pipeline or the two connection ends (pipeline connectors).

It further proves advantageous to combine the heating elements with a different heating behaviour with one another or construct the same in a combinable manner, particularly to provide one heating element with a PTC behaviour at or on one connection end. A PTC means a positive temperature coefficient, usually of a resistance, that is to say a sudden increase of the resistance at a certain temperature or over a short temperature range. PTC resistances are current-conducting materials, which can better conduct the current at lower temperatures than at high temperatures. The electrical resistance thereof increases with increasing temperature. This type of resistances therefore has a positive temperature coefficient.

For example, a heating element with a PTC resistance is provided on one of the connection ends, wherein this connection end constitutes the hot region of the heatable media pipeline. Thus, a combination of heating elements with different heating behaviour or in particular temperature behaviour can be provided here, wherein the same is used for example for protection against overheating. Here, in particular, a self-regulating behaviour of the heating elements can be provided.

The heatable media pipeline can comprise at least two media pipelines arranged in one another, wherein one internal media pipeline can be internally heated and heatable media can flow or flows in the intermediate space between the at least one internal media pipeline and an external media pipeline. The media pipeline can therefore consist of a plurality of media pipelines arranged in one another, wherein at least one of the same can be heated by heating elements and medium to be heated can flow between two media pipelines.

It furthermore proves advantageous for different heat dissipation to provide apparatuses, which have different insulating properties, at the connection ends of the media pipeline. For example, insulation can be created by providing one of the connection ends with an external insulation cap and the other connection end without such a cap. Other types of shells or an apparatus having a shell-function, which have different insulating properties, can also be provided at the respective connection ends, in order to enable a different heat dissipation here.

BRIEF DESCRIPTION OF THE DRAWINGS

For a more detailed description of the invention, exemplary embodiments of the same are explained in more detail on the basis of the drawings in the following. In the drawings.

DETAILED DESCRIPTION OF THE INVENTION

Figure 1:
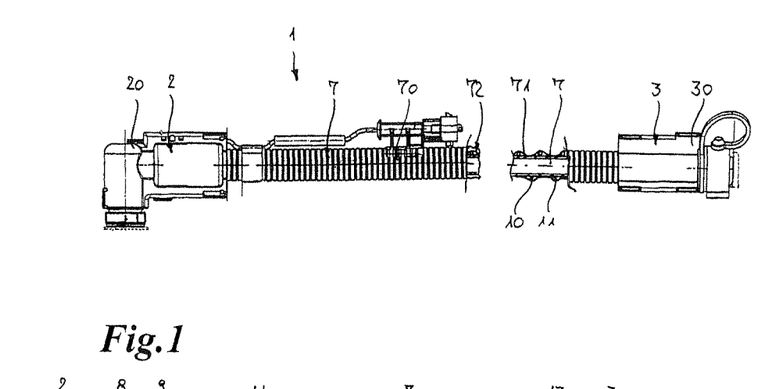
FIG. 1 shows a side view of an assembled heatable media pipeline according to the invention.

FIG. 1 shows a side view of a heatable media pipeline 1 with two connection ends 2, 3 in the form of pipeline connectors. The pipeline connectors 2, 3 are in each case constructed for connection to most different apparatuses or units. In the example shown in FIG. 1, the pipeline connector 2 is constructed as angled connector and the pipeline connector 3 is constructed as straight pipeline connector. This can however also be reversed or both pipeline connectors 2, 3 can also be constructed in a straight or angled manner.

Figures 9, 11:
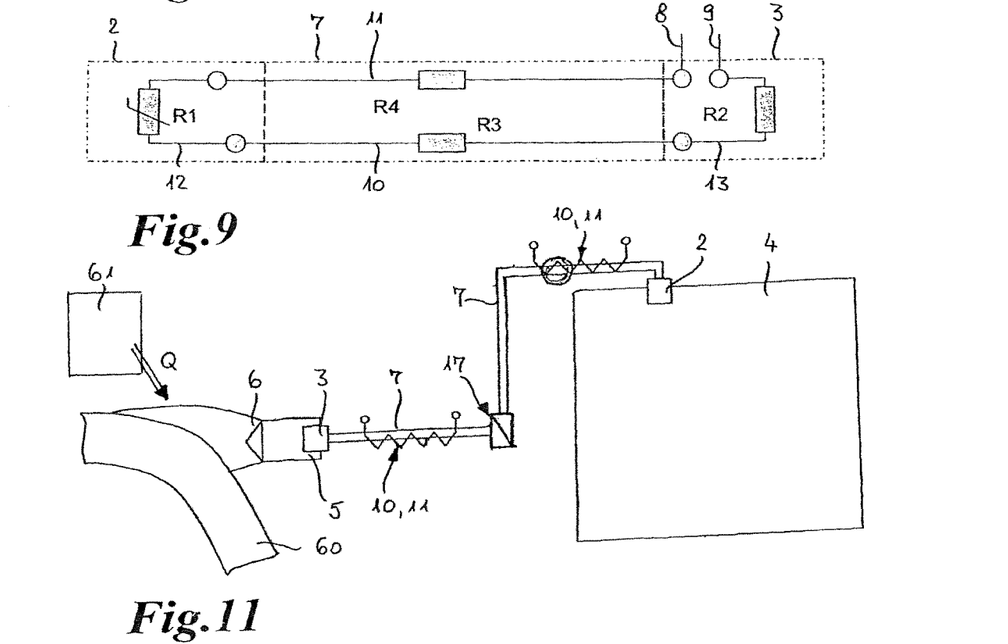
FIG. 9 shows a schematic sketch of an eighth embodiment of a wiring arrangement according to the invention of heating elements of a heatable media pipeline.
FIG. 11 shows a schematic sketch of an SCR catalyst system with an embodiment of a heatable media pipeline according to the invention.

For example, a tank 4 can be connected on the one side and a dosing module 5 can be connected on the other side of the heatable media pipeline, as can be drawn from FIG. 11. The first connection end 2 of the heatable media pipeline 1 is coupled in the region of the tank 4, whilst the second connection end 3 is connected to the dosing module 5, which for its part is part of an injection apparatus 6. This is arranged close to an exhaust-system branch 60 and also an engine 61, which is only indicated. The radiation of heat into the region of the injection apparatus 6 is indicated by Q. Thus, a so-called SCR catalyst system of a vehicle internal combustion engine is shown in FIG. 11, wherein the heatable media pipeline 1 constitutes the connection between the tank 4 and the injection apparatus 6. In FIG. 11, two heatable media pipelines, which are connected in series, are arranged between the tank 4 and the injection apparatus 6 or the dosing module 5. This is often provided for reasons of installation, wherein the tank is installed with a short pipeline, as otherwise, after the installation of the tank, the same would no longer be accessible for connecting a media pipeline. The two heatable media pipelines are connected to one another in the region of the connection or separation point 17. However, alternatively, it is also possible for only one heatable media pipeline to be arranged between the two pipeline connectors 2, 3.

Owing to the most different environmental temperatures or heat radiation or conduction, a warm and a cold end or a warm and a cold region of the media pipeline result, wherein the comparatively cold end is arranged in the region of the tank 4 and the comparatively warm end is arranged in the region of the dosing module 5. The region closer to the engine is termed the warm or warmer region/the warm or warmer end and all other regions/ends are termed cold region/cold end. A different heat requirement results therefrom at the two ends of the heatable media pipeline, in any case after a certain switch-on period, that is to say in the region of the first and the second connection end 2, 3 of the heatable media pipeline. Until operational readiness is reached, not too much heat should be coupled in at the nonetheless warmer end, that is to say the same should be less intensively heated, wherein here also, there is a time dependence, that is to say, the one end does not have to be heated for as long as the other. In order to cover this different heat requirement, a different output coupling of the electrical power in watts can be provided at the two connection ends 2, 3 of the heatable media pipeline 1. This additionally constitutes a protection of the hot region from overheating. If both ends of the heatable media pipeline are subject to the same regulation strategy, overheating protection can therefore be created thereby after the thawing and heating of the medium. This can be provided e.g. by variation of the number of windings, the pitch of the windings and also the guiding or arrangement of the windings on or at the two connection ends or pipeline connectors 2, 3. The number of heating strands can be chosen to be the same at both ends in this case.

Figure 2:
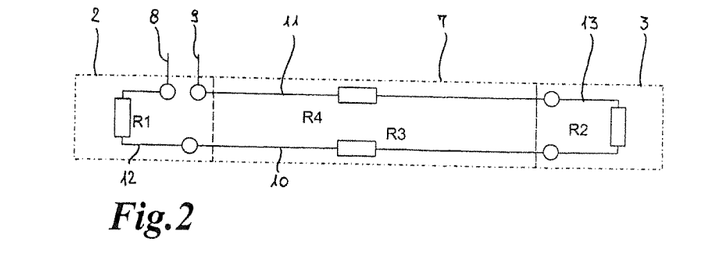
FIG. 2 shows a schematic sketch of a first embodiment of a wiring arrangement according to the invention of heating elements of the heatable media pipeline according to FIG. 1.

Furthermore, it is possible, as shown in FIG. 2, to use different heating strands on or at the two connection ends 2, 3. In the embodiment of the heatable media pipeline according to FIG. 2, four heating strands or heating elements 10, 11, 12, 13 are provided. The heating strands 10, 11 in this case extend along the media pipeline 7, whilst the heating strand 13 is arranged at or on the second connection end 3 of the heatable media pipeline 1 and the heating strand 12 is arranged at or on the first connection end 2 of the heatable media pipeline 1. The heating strand 12 has a resistance R1 and the heating strand 13 has a resistance R2. For the case that the connection end 2 is constructed as a hot region, the resistance R1 of the heating strand 12 is smaller than the resistance R2 of the heating strand 13. The resistances R3 and R4 of the first and second heating strands 10, 11 are constructed such that they are of equal size in the exemplary embodiment according to FIG. 2. They can however also be constructed to be differently sized and/or be arranged on the pipeline with a different pitch. There are few options for varying the heating conductor fastening on the pipeline connector, by contrast with the media pipeline, as the fastening of the heating conductors and as a result for the most part also the pitch thereof is fixed for the pipeline connectors. One variation option therefore consists in providing a separate heating strand or arranging one or two heating strands of the pipeline on the pipeline connector.

Leads 8, 9 are connected to the heating strand 11 and the heating strand 12. A lead is understood to mean a conductor, which is used for heating conductor connection to an energy supply (current or voltage sources) and is not provided for heating. Therefore, a lead usually has a lower resistance than a heating conductor. It is likewise fundamentally possible to connect the two leads 8, 9 to the heating strand 11 and the heating strand 13. Furthermore, the two heating strands 12, 13 can also be constructed in such a manner that the resistance of the heating strand 12 is larger than the resistance of the heating strand 13, wherein the heating strand with the lower resistance is conventionally provided in the hot region and the heating strand with the comparatively higher resistance is provided in the cold region. The two leads 8, 9 are shown by way of example in the design variant shown in FIGS. 1 and 2 led out through the pipeline connector 2 and shown by way of example in the design variants shown in FIGS. 3 to 6 and 9 led out through the pipeline connector 3.

Figure 3:
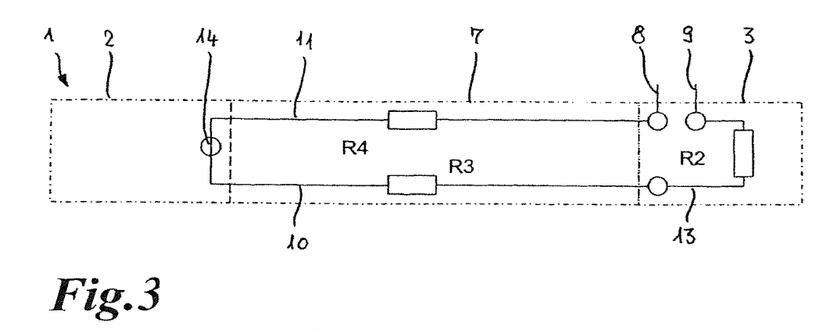
FIG. 3 shows a schematic sketch of a second embodiment of a wiring arrangement according to the invention of heating elements of a heatable media pipeline.

FIG. 3 shows a second embodiment of the heatable media pipeline 1, in which, by contrast with the embodiment according to FIG. 2, only three heating strands are provided however. The heating strand 12 is omitted when compared to the embodiment according to FIG. 2 and the two ends of the heating strands 10, 11 arranged in the region of the first connection end or first pipeline connector (quick connector) 2 are connected to one another, as indicated by the connection point 14 in FIG. 3. The first connection end or the first pipeline connector 2 is arranged in the hot region in this embodiment also, so that the resistance R1 of the heating strand 12 is dispensed with here. This can for example prove sensible if different thermal masses are arranged at the two connection ends 2, 3, for example one unit with a high thermal mass at the one end. The pipeline connector 2 can for example be arranged close to the engine in such a manner that the heating by means of the hot surroundings is satisfactory, in order to thaw the medium in the pipeline connector or in the media pipeline at the same end/in the same region, as close to the engine, the exhaust gas in the exhaust-system branch is particularly hot.

Figure 4:
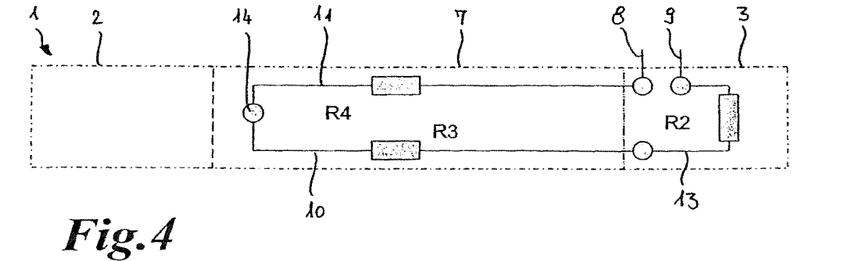
FIG. 4 shows a schematic sketch of a third embodiment of a wiring arrangement according to the invention for a heatable media pipeline.

FIG. 4 shows a further embodiment of the heatable media pipeline 1. Here also, the heating strand 12 is dispensed with, wherein the ends of the heating strands 10, 11 ending on, in or at the media pipeline 7 in the region of the first connection end 2 of the heatable media pipeline 1 are connected to one another in the region of the media pipeline 7. A part of the media pipeline 7 remains unheated as a result, just as for the first pipeline connector or connection end 2. This is particularly suitable for the case, in which the heatable media pipeline 1 is exposed to an intensive heat feed from the surroundings. A region of the media pipeline 7 close to the engine can in this case likewise remain unheated. Both in the embodiment according to FIG. 3 and in the embodiment of the heatable media pipeline according to FIG. 4, the two leads 8, 9 are joined to the heating strand 11 and the heating strand 13.

Figure 5:
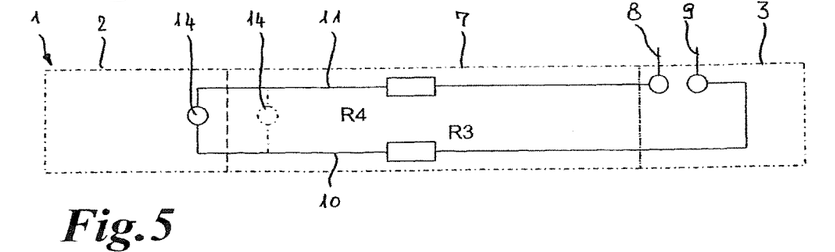
FIG. 5 shows a schematic sketch of a fourth embodiment of a wiring arrangement according to the invention of heating elements of a heatable media pipeline.
Figure 6:
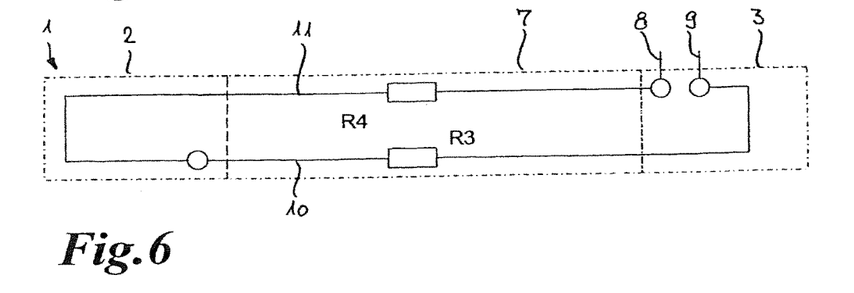
FIG. 6 shows a schematic sketch of a fifth embodiment of a wiring arrangement according to the invention of heating elements of a heatable media pipeline.

In the embodiments of the heatable media pipeline 1 according to FIGS. 5 and 6, only two heating strands 10, 11, are provided. The two leads 8, 9 are therefore connected to these two heating strands 10, 11, wherein the arrangement of the leads 8, 9 in both embodiments is provided in the region of the second connection end or pipeline connector 3. Two different design variants are illustrated in FIG. 5, wherein one is shown in dashed lines. The difference between these two design variants consists in the fact that the connection point 14 between the heating strand 10, 11 is either provided, as shown in FIG. 3, in the region of the first connection end or pipeline connector 2 or, as shown in FIG. 4, along the media pipeline 7. The connection point 14 is a crimp point, which it may be sensible to avoid arranging in the hot region, in order to protect the same from too great a heat. For a permanently sealed crimp connection, temperature-resistant materials can be used or the crimp connection can, as mentioned, be arranged in a temperature range, in which it furthermore remains sealed. In none of the cases is the first pipeline connector or the first connection end 2 heated as hot region.

In the variant of the arrangement of the connection point 14 along the media pipeline 7, which is illustrated dashed, a part of the same remains completely unheated. In the variant illustrated with solid lines, in which the connection point 14 is arranged on or at the first connection end or pipeline connector 2, at least this part of the pipeline connector or connection end is heated or can be heated. The resistances R3 and R4 of the two heating strands 10, 11, can be differently constructed or dimensioned, so that, in this manner, a variance in the output coupling at the two ends of the heatable media pipeline is possible. The same is also true for the embodiment of the heatable media pipeline according to FIG. 6, wherein, in the embodiment illustrated, the resistance R4 of the heating strand 11 is constructed smaller than the resistance R3 of the heating strand 10 and wherein the heating strand 11 extends in the hot region, as it is arranged at or on the first connection end or pipeline connector 2. The heating strand 10 extends beyond the second connection end or the second pipeline connector 3. Thus, one heating strand in each case is provided for wrapping or arranging on or at one connection end/pipeline connector 2, 3 in each case.

Figure 7:
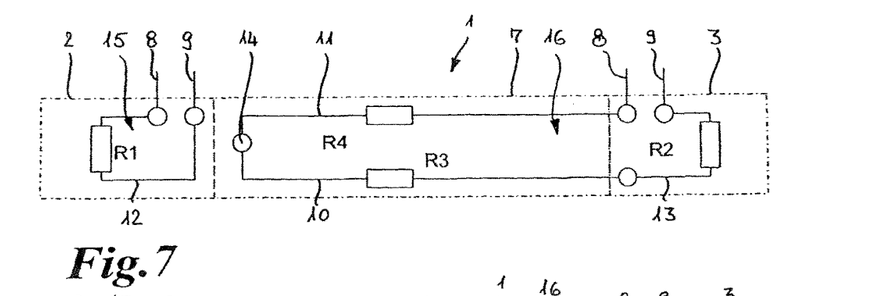
FIG. 7 shows a schematic sketch of a sixth embodiment of a wiring arrangement according to the invention of heating elements of a heatable media pipeline.
Figure 8:
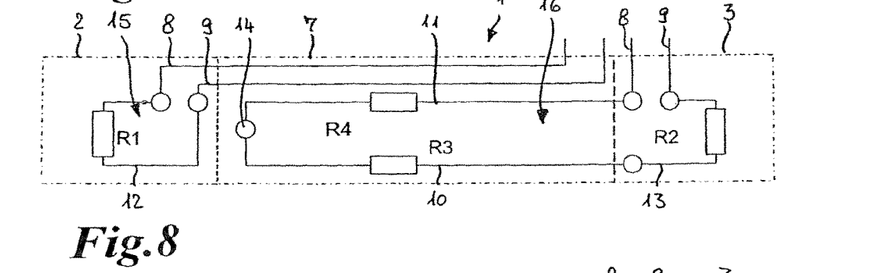
FIG. 8 shows a schematic sketch of a seventh embodiment of a wiring arrangement according to the invention of a heatable media pipeline.

In the embodiment of the heatable media pipeline 1 according to FIGS. 7 and 8, separate circuits are formed, wherein the first connection end or the first pipeline connector 2 in each case comprises a first circuit 15, formed from the heating strand 12, and the second circuit 16 [lacuna] the two heating strands 10, 11, which extend along at least a part of the media pipeline 7 and the heating strand 13, which extends at or on or over the second connection end or the second pipeline connector 3. Leads 8, 9 are accordingly arranged at the two circuits, in order to allow a current supply. Assuming that the connection end or the pipeline connector 2 is furthermore arranged in the hot region, the resistance R1 is smaller than the resistance R2.

The inverse may also be true, however, wherein by providing the different circuits, the individual regions of the heatable media pipeline can be heated differently, depending on how high the respective heat requirement is at the connection ends 2, 3 of the heatable media pipeline 1.

In the embodiment of the heatable media pipeline according to FIG. 8, the difference from the embodiment according to FIG. 7 merely consists in the fact that the two leads 8, 9 of the first circuit 15 are moved to the side of the second connection end 3 of the heatable media pipeline, so that all lead connections are located on one side of the heatable media pipeline.

If at least two circuits are provided, different regulation strategies can be followed. For example, individual circuits, in FIGS. 7 and 8 one of the circuits, can be switched off as required, for example in the event of exceeding a predeterminable temperature threshold. Likewise, a clocked operation or else also continuous operation of both circuits is possible. This can also be controlled or regulated by means of a regulating apparatus not shown in FIGS. 7 and 8.

A further embodiment of the heatable media pipeline 1 is shown in FIG. 9. In this design variant, by contrast with the design variant according to FIG. 2, the resistance R1 of the heating strand 12, which is arranged at, on or over the connection end 2 of the heatable media pipeline 1, is constructed as a PTC resistance, wherein the first connection end 2 is furthermore provided in the hot region of the heatable media pipeline. Therefore, in this design variant, a combination of heating strands or heating elements with different heating behaviour or temperature behaviour is provided. This can prove advantageous for example, if a self-regulating behaviour, for example to prevent overheating, should be provided.

Figure 10A:
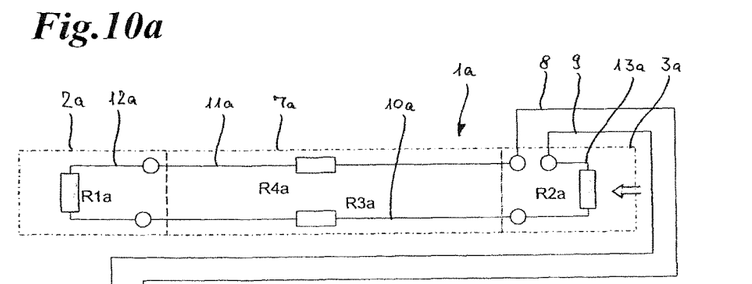
FIG. 10*a* and FIG. 10*b* show schematic sketches of a ninth embodiment of a wiring arrangement according to the invention for a heatable media pipeline.
Figure 10B:
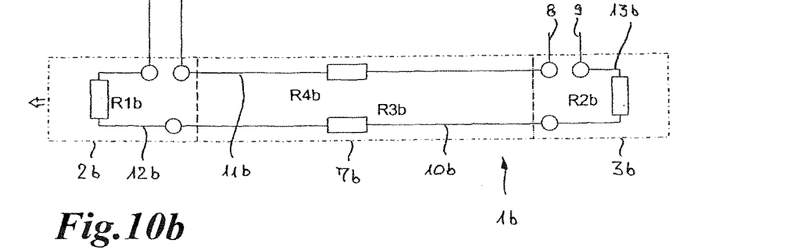

The FIGS. 10a and 10b form a combination of two heatable media pipelines according to FIG. 1, as illustrated for example in FIG. 11 with separation or connection point 17, wherein a pipeline is quasi formed. As mentioned, it is possible in the arrangement according to FIG. 11 for just one media pipeline to be provided. The two pipelines are connected to one another via leads 8, 9, wherein the first heatable media pipeline 1a is provided with connections to the two leads 8, 9 in the region of the second connection end or pipeline connector 3a and the two leads 8, 9 extend to the first connection end 2b of the second heatable media pipeline 1b and are there connected to the heating strands 12b and 11b. The second media pipeline 1b additionally has two further leads 8, 9 for connection to a current supply in the region of the second connection end 3b thereof. In this design variant of a combination of two heatable media pipelines to form one in principle, only the region of the first connection end 2a of the first heatable media pipeline 1a is constructed as a hot region, thus the heating strand 12a is designed accordingly there with respect to the resistance R1a thereof. The further resistances R2a, R1b and R2b of the second connection end 3a of the first heatable media pipeline 1a and the first and second connection ends 2b, 3b of the second heatable media pipeline 1b are located in a cold region in each case. Accordingly, the resistances R2a, R1b, R2b of the corresponding heating strands 12b and 13a, 13b are larger than the resistance R1a of the heating strand 12a of the first heatable media pipeline 1a. The heating strands 10a, 10b, 11a, 11b extend along the two media pipelines 7a, 7b.

As indicated in FIG. 1 at the two connection ends 2, 3, the same are provided with external insulating apparatuses 20, 30, which exert a protective function at the same time. Insofar as there is a requirement for different heat dissipation, the insulating apparatuses 20, 30 can be differently constructed, particularly have different insulating properties. This can be provided by variation of the choice of material, just as with by variation of the configuration of the two insulating apparatuses. Furthermore, it is fundamentally possible to dispense with such insulating apparatuses on one side or on both sides and for example to only provide a protective shell as protection from damage there. The cladding pipe, for example the corrugated pipe 70, externally surrounding the media pipeline also executes such an insulating function however. The structure of the pipeline therefore contains a wrapping of the media pipeline 7 with heating strands 10, 11, a wrapping with tape 71 or adhesive, fabric or fabric-adhesive tape and passing over the cladding pipe 70, leaving an insulating air gap 72 between the wrapped media pipeline and the cladding pipe.

The two connection ends or pipeline connectors 2, 3 can consist of different materials. For example, a more conductive material can be used for the one pipeline connector than for the other, for example a metal and/or a conductive plastic can be used as more conductive material and a standard plastic can be used as less conductive material. By means of such a variation of the pipeline connectors, a better temperature distribution can be provided, particularly heat dissipation into components connected to the heatable media pipeline. One option for variation consists in providing a coupling part on the one hand and a plug connector on the other hand as connection ends of the heatable media pipeline. The prevention of so-called hot spots is also thereby possible.

Furthermore, heat input into a part region of the pipeline connector or connection end is possible, for example a radial heat transfer from the media pipeline into at least one of the pipeline connectors. This is particularly suitable if, for reasons of space at the pipeline connector, no additional heating technology can be arranged or integrated in the same. A material with a thermal conductivity of 1 to 20 W/(m·K), particularly 1 to 7 W/(m·K) is suitable as material for such a pipeline connector or the thermally conductive part of such a pipeline connector in particular. Furthermore, it proves advantageous to use a material which has an elongation at break of 1 to 10%, particularly an elongation at break of approximately 2%. A high thermal conductivity is achieved by means of a filler proportion which is as high as possible, which however severely impairs the mechanical properties, particularly of plastic, so that plastic becomes very brittle and the strength thereof decreases. Thus, a good compromise between the desired high thermal conductivity and good mechanical properties is selected. Principally mineral fillers, such as long glass fibres or short glass fibres are suitable as filler. For example, a polymer PA66 with long glass fibres can be used as filler, which has a tensile strength of approximately 145 MPa and an elongation at break of 2%, such as example Star-Therm® WG A-2 from the company EPIC Polymers Ltd., Kaiserslautern. A polymer PA 66 with short glass fibres is also suitable as a carbon-based (graphite) filler with a tensile strength of 60 MPa and an elongation at break of 0.9%, for example the product Alcom PA66 910/30.1 GF15 TCE5 of the company ALBIS Plastic GmbH, is likewise suitable, as it is very conductive. Other thermally conductive materials are also suitable for producing the pipeline connector, particularly also material combinations.

As indicated in FIG. 11, at least one separation or connection point 17 can be provided along the heatable media pipeline. The media pipeline can as a result be constructed in two parts, as already indicated in FIGS. 10a and 10b. Aside from the provision of a division in two of the heatable media pipeline, a division into multiple parts, for example a division in three, can also be provided. In the case of the latter, separation or connection points or a first, a second and a third heatable media pipeline would be provided, which are connected or coupled to one another. As, in the course of system simplifications, the dosing point with the dosing module 5 is displaced ever further in the direction of the engine block, such a separation of the heatable media pipeline into two mutually coupled pipelines proves advantageous, as heating or heating technology can be provided close to the point to be heated in the region of the components connected to the heatable media pipeline in each case. In the design variant shown in FIG. 11, such heating technology is provided for the media pipeline and the pipeline connector 2 in the region of the tank 4. The separation point 17 can for example be constructed by means of coupling parts, which are arranged at the end on both parts of the heatable media pipeline and can be plugged together. Furthermore, such a separability of the heatable media pipeline, that is to say the provision of a separation or coupling point 17, facilitates the installation of the heatable media pipeline in the vehicle.

Figure 12:
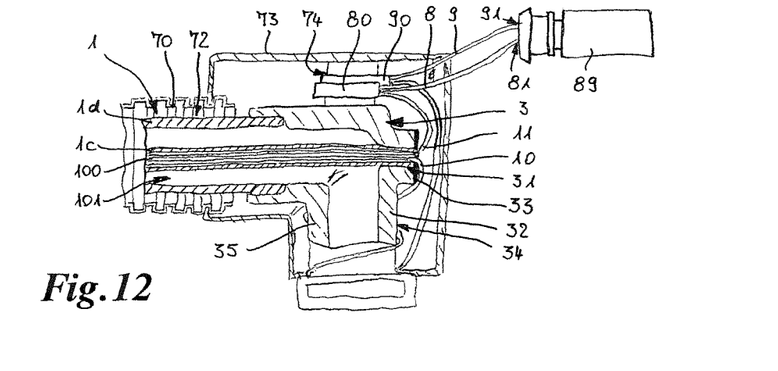
FIG. 12 shows a partially cutaway view through a pipeline connector with a two-part media pipeline and a wiring arrangement according to the invention of heating elements, wherein an internal and an external media pipeline are arranged in one another.

A further embodiment of the heatable media pipeline 1 and the pipeline connector 3, here in the form of an angled connector, attached to the same are shown in FIG. 12. The heatable media pipeline 1 here comprises two media pipelines arranged in one another, an internal media pipeline 1c and an external media pipeline 1d. The internal media pipeline 1c has the two heating strands 10, 11 in the internal lumen 100 thereof and is therefore internally heatable thereby. Medium to be heated can flow through the intermediate space 101 between the internal media pipeline 1c and the external media pipeline 1d. The external media pipeline 1d is joined to the pipeline connector 3. The internal media pipeline 1c is guided out through an opening 31 in the wall 32 of the pipeline connector 3. In order to externally seal the point of passage through the wall 32 to the outside, in order to prevent medium from penetrating out of the intermediate space 101 to the outside, a closure component 33 is arranged there on the outer side 34 of the wall 32. The cladding or corrugated pipe 70 is arranged externally surrounding the media pipeline outside the pipeline connector 3, leaving the insulating air gap 72 between the external media pipeline 1d and the cladding pipe 70. For further insulation of the pipeline connector 3 also, an external insulating or protective cap 73 is provided surrounding the same and an end of the cladding pipe.

The two heating strands 10, 11 guided through the internal media pipeline 1c are guided out through the same at the end. The shorter of the two heating strands 10, 11, e.g. in the embodiment according to FIG. 5, the heating strand 11, in the one according to FIG. 6, the heating strand 10, is connected to the lead 8 at a connection point 80, for example by means of a crimp connection. In addition, the connection can be sealed by means of shrink-down tubing or encapsulation. The longer of the two heating strands 10, 11, e.g. in the embodiment according to FIG. 5, the heating strand 10, in the one according to FIG. 6, the heating strand 11, is initially wound around the angled connection piece 35 and subsequently guided to a connection point 90 for connection to the lead 9. This connection can also be a crimp connection, which is additionally externally sealed by means of a shrink-down tubing and/or a casting material. Both connection points 80, 90 are arranged inside the protective cap 73, particularly accommodated in a receptacle 74 provided therefor. Both leads 8, 9 are provided with a plug 89 at the ends 81, 91 thereof opposite the connection points 80, 90, which plug is used for connection to an electrical energy supply.

In addition to the thermal conductivity of the pipeline connector, a certain temperature resistance may also be important in the hot region. Advantageously, a material, which is more temperature resistant compared to the material used for the other pipeline connector 3, for example a temperature-resistant plastic material, particularly a polymer, such as a PPA (polyphthalamide), can be used for the pipeline connector 2 arranged in the hot region. It furthermore proves advantageous if the media pipeline 7 also consists of a more temperature resistant material in this region. Here, the provision of a pipeline, divided in two is suitable, as shown in FIGS. 10a and 10b or 11. The pipeline connector or quick connector 2 and a part of the media pipeline 7 can therefore consist e.g. of PPA and the remaining media pipeline, just like the pipeline connector 3, which can be arranged in the cold region and constructed as a plug connector, can consist e.g. of a polyamide 12. The pipeline connector can also consist of PA12 GF30 or a polyamide 6. When using a hose-like media pipeline, the same can consist of EPDM (ethylene propylene diene monomer) in combination with a pipeline connector made from PPA in the hot region.

The part of the media pipeline consisting of a temperature-resistant material, such as PPA, can consist e.g. in a fabric tape 71 and a cladding or corrugated pipe 70 made of a temperature-resistant TPC (thermoplastic polyester elastomer), the crimp connection in this region can consist in this region e.g. of the alloy K-75 and shrink-down tubing can consist of FEP (fluorinated ethylene propylene). The remaining media pipeline (in the cold region) made up of PA 12 can be wrapped with standard tape 71 and enveloped by a cladding or corrugated pipe 70 made up of modified polypropylene (PPMod). The crimp connection in this region can consist of CuZn30 and shrink-down tubing made from XPE (radiation-crosslinked polyethylene).

PPA is particularly suitable for higher temperatures and has a very good permeation behaviour, thus is barely permeable for aggressive media flowing through the heatable media pipeline.

All of the design variants mentioned previously and shown in the figures, can be combined with one another as desired, particularly by means of connecting one behind the other, as shown by way of example in FIGS. 10a and 10b for two parts of a media pipeline. Furthermore, the variants of the arrangement of heating strands along the media pipeline 7 and the two connection ends or pipeline connectors 2, 3 described previously and shown in the figures can be combined with one another and varied as desired, in order to provide the desired differentiated heat input to the connection ends of the assembled heatable media pipeline 1. In particular, instead of the resistances R1, PTCs can also be used in all design variants.

In addition to the design variants of heatable media pipelines with at least one media pipeline with two connection ends and at least two electrical heating elements, which is mentioned at the beginning and shown in the figures, numerous further design variants can be formed, in which at least one means is provided in each case, by means of which a different heat input and/or output is enabled at the two connection ends of the media pipeline.

REFERENCE LIST

1 Heatable media pipeline
1*a* First heatable media pipeline
1*b* Second heatable media pipeline
1*c* Internal media pipeline
1*d* External media pipeline
2 First connection end/first pipeline connector
2*a* First connection end/first pipeline connector of 1*a*
2*b* First connection end/first pipeline connector of 1*b*
3 Second connection end/second pipeline connector
3*a* Second connection end/second pipeline connector of 1*a*
3*b* Second connection end/second pipeline connector of 1*b*
4 Tank
5 Dosing module
6 Injection apparatus
7 Media pipeline
7*a* Media pipeline
7*b* Media pipeline
8 Lead
9 Lead
10 First heating strand/first heating element
10*a* First heating strand/first heating element
10*b* First heating strand/first heating element
11 Second heating strand/second heating element
11*a* Second heating strand/second heating element
11*b* Second heating strand/second heating element
12 Third heating strand/third heating element
12*a* Third heating strand/third heating element
12*b* Third heating strand/third heating element
13 Fourth heating strand/fourth heating element
13*a* Fourth heating strand/fourth heating element
13*b* Fourth heating strand/fourth heating element
14 Connection point
15 First circuit
16 Second circuit
17 Separation point/connection point
20 Insulating apparatus
30 Insulating apparatus
31 Opening
32 Wall
33 Closure component
34 Outer side
35 Angled connection piece
60 Exhaust-gas system branch
61 Engine
70 Corrugated pipe
71 Tape
72 Air gap
73 Protective cap
74 Receptacle
80 Connection point
81 End
89 Plug
90 Connection point
91 End
100 Internal lumen of 1*c*
101 Intermediate space between 1*c* and 1*d*

What is claimed is:

1. A heatable media pipeline, comprising: at least one media pipeline with two connection ends and two or three electrical heating elements that are electrical heating strands, wherein the two or three electrical heating elements are connected in series, wherein a first electrical heating element and a second electrical heating element extend along the media pipeline, wherein at least one means is provided, by which, a differentiated heat input is enabled or is provided at the two connection ends of the heatable media pipeline, and the means is a different input coupling at the two connection ends, wherein a different arrangement of the heating elements is provided at the two connection ends, wherein one end of each of the first and the second heating elements are connected to one another at a connection point, wherein the connection point is arranged either on or at the first connection end or along the media pipeline, and wherein one of the first heating element, second heating element and, if provided, the third heating element is arranged on or at the second connection end, wherein
   a) different heating elements are provided at the two connection ends, or
   b) the heating elements have a different resistance in regions of the two connection ends, or
   c) a combination thereof.

2. The heatable media pipeline according to claim 1, wherein a different number of windings is provided at the two connection ends.

3. The heatable media pipeline according to claim 1, wherein the heating elements extending along the media pipeline and for arrangement on the connection end are provided at one of the two connection ends, and the third heating element for arrangement on the other connection end is provided, wherein the third heating element is connected to the other two heating elements.

4. The heatable media pipeline according to claim 1, wherein two heating elements are provided, wherein one or both heating elements is arranged at or on only one connection end.

5. The heatable media pipeline according to claim 1, wherein three heating elements are provided, wherein at least one of the heating elements is only arranged at or on one connection end.

6. The heatable media pipeline according to claim 1, wherein two heating elements are provided, wherein one heating element in each case is arranged at or on only one connection end.

7. The heatable media pipeline according to claim 1, wherein the two connection endsare of different thermally conductive construction.

8. The heatable media pipeline according to claim 1, wherein the heating elements are connected to one another in such a manner that the same form at least two circuits for the independent and/or different heating of the two connection ends.

9. The heatable media pipeline according to claim 8, wherein a first circuit comprises a connection end and the media pipeline and a second circuit can comprise only the other connection end.

10. The heatable media pipeline according to claim 9, wherein at least two circuits can be operated or are operated with different regulation strategies.

11. The heatable media pipeline according to claim 1, wherein the heating elements can be combined or are combined with a different heating behaviour with one another.

12. The heatable media pipeline according to claim 1, wherein apparatuses, which have different insulating properties, are provided for different heat dissipation at the connection ends of the media pipeline.

13. The heatable media pipeline according to claim 1, wherein the heatable media pipeline comprises at least two media pipelines arranged in one another, wherein one internal media pipeline can be internally heated and heatable media can flow or flows in the intermediate space between the at least one internal media pipeline and an external media pipeline.

14. The heatable media pipeline according to claim 1, wherein the connection end is a pipeline connector.

15. The heatable media pipeline according to claim 10, wherein a selective switching off of one of the two circuits and/or a clocked operation and/or a continuous operation of the at least one circuit is/are provided.

16. The heatable media pipeline according to claim 15, wherein a selective switching off of one of the two circuits is provided if a predeterminable temperature threshold is exceeded.

17. The heatable media pipeline according to claim 11, wherein one heating element with a PTC behaviour at or on one connection end is provided.

18. A heatable media pipeline, comprising: at least one media pipeline with two connection ends and two or three electrical heating elements that are electrical heating strands, wherein the two or three electrical heating elements are connected in series, wherein a first electrical heating element and a second electrical heating element extend along the media pipeline, wherein at least one means is provided, by which, a differentiated heat input is enabled or is provided at the two connection ends of the heatable media pipeline, and the means is a different input coupling at the two connection ends, wherein a different arrangement of the heating elements is provided at the two connection ends, wherein one end of each of the first and the second heating elements are connected to one another at a connection point, wherein the connection point is arranged either on or at the first connection end or along the media pipeline, and wherein one of the first heating element, second heating element and, if provided, the third heating element is arranged on or at the second connection end, wherein the heatable media pipeline has one circuit consisting of a first lead and a second lead that are connected to the two or three electrical heating elements.

19. A heatable media pipeline, comprising: at least one media pipeline with two connection ends and two or three electrical heating elements that are electrical heating strands, wherein the two or three electrical heating elements are connected in series, wherein a first electrical heating element and a second electrical heating element extend along the media pipeline, wherein at least one means is provided, by which, a differentiated heat input is enabled or is provided at the two connection ends of the heatable media pipeline, and the means is a different input coupling at the two connection ends, wherein a different arrangement of the heating elements is provided at the two connection ends, wherein one end of each of the first and the second heating elements are connected to one another at a connection point, wherein the connection point is arranged either on or at the first connection end or along the media pipeline, and wherein one of the first heating element, second heating element and, if provided, the third heating element is arranged on or at the second connection end, wherein a first lead is connected to an end of one of the heating elements and a second lead is connected to a different heating element, wherein the leads each have a free end that extends out from the end of the heatable media pipeline which free end is provided for connection to an energy supply.

* * * * *